United States Patent
Akutsu et al.

(10) Patent No.: US 6,936,949 B2
(45) Date of Patent: Aug. 30, 2005

(54) ROTATION ANGLE DETECTING APPARATUS

(75) Inventors: Satoru Akutsu, Tokyo (JP); Tetsunao Takaki, Tokyo (JP); Masafumi Okazaki, Tokyo (JP); Toshinori Tanaka, Tokyo (JP); Akira Hashimoto, Tokyo (JP); Kazuyuki Yamamoto, Tokyo (JP); Takeshi Sugiyama, Tokyo (JP); Hideki Megata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/301,758

(22) Filed: Nov. 22, 2002

(65) Prior Publication Data

US 2003/0222531 A1 Dec. 4, 2003

(30) Foreign Application Priority Data

May 16, 2002 (JP) .................................. 2002-141480

(51) Int. Cl.⁷ ................................................ H02K 9/00
(52) U.S. Cl. ........................ 310/218; 310/179; 310/216; 310/217; 310/261
(58) Field of Search ................................ 310/218, 179, 310/216, 217, 261

(56) References Cited

U.S. PATENT DOCUMENTS

| | | | | |
|---|---|---|---|---|
| 4,939,399 A | * | 7/1990 | Oh .............................. | 310/198 |
| 5,684,352 A | * | 11/1997 | Mita ........................... | 310/156 |
| 5,859,486 A | * | 1/1999 | Nakahara ..................... | 310/245 |
| 5,955,807 A | * | 9/1999 | Kajiura ........................ | 310/156 |

FOREIGN PATENT DOCUMENTS

| | | | | |
|---|---|---|---|---|
| JP | 48-101501 | 12/1973 | | |
| JP | 55-120358 | 9/1980 | | |
| JP | 2000-201458 | * 7/2000 | .......... | H02K/15/02 |
| JP | 2001-136703 | 5/2001 | | |
| JP | 2002-107179 | 4/2002 | | |
| JP | 2002-112483 | 4/2002 | | |

* cited by examiner

*Primary Examiner*—Darren Schuberg
*Assistant Examiner*—Iraj A. Mohandesi
(74) *Attorney, Agent, or Firm*—Sughrue Mion, PLLC

(57) ABSTRACT

A rotation angle detector includes a stator core (2) comprised of a plurality of core sheets (4) each having plural core members (4a) each including a tooth and a yoke portion (5a, ..., 5h, 4b) disposed in a strip-like array with adjacent core members being coupled to one another by coupling means (4d) at yoke end portion. The core member is laminated. The stator core is shaped into an annular form by bending the core members at coupled portions so that the tooth portions extend centrally while capable of extending substantially linearly upon expansion thereof. An exciting winding (8) and output windings (9, 10) of n phases are wound on the tooth portions. A rotor core (3) is disposed rotatably relative to the stator core such that gap permeance between the rotor core and the tooth portions changes sinusoidally as a function of the rotation angle.

2 Claims, 18 Drawing Sheets

ROTATION ANGLE DETECTING APPARATUS

BACKGROUND OF THE INVENTION

1. Field of the Invention

The present invention generally relates to a variable reluctance resolver type apparatus for detecting an angle of rotation (e.g. angular position of a rotating member such as a shaft of a machine). More particularly, the present invention is concerned with a rotation angle detecting apparatus having a foldable or bendable laminated core.

2. Description of Related Art

For having better understanding of the concept underlying the present invention, description will first be made of a conventional rotation angle detecting apparatus known heretofore. FIG. 20 of the accompanying drawings is a perspective view showing an annular stator of a conventional rotation angle detecting apparatus which is disclosed in, for example, Japanese Patent Application Laid-Open Publication No. 136703/2001 (JP-A-13-136703). In FIG. 20, reference numeral 101 denotes an annular stator implemented substantially in the form of an annulus of a laminated or sintered integral structure or the like. Disposed on and along both side surfaces of the annular stator 101 are a pair of insulation caps 106 each of which is formed of an insulation material such as a resin or the like in a ring-like shape and between which the annular stator 101 is fixedly mounted, being sandwiched. Incidentally, in FIG. 20, one of the insulation caps 106 is omitted from illustration.

A plurality of tooth portions 105a and a plurality of slots 105b are formed alternately with each other in an inner side surface of the annular stator 101 while formed in the insulation cap 106 are projecting portions 106a which correspond to the tooth portions 105a, respectively, and slot portions 106b which correspond to the slots 105b, respectively. In this manner, each of the tooth portions 105a as well as each of the slots 105b are retained in the state electrically insulated from each other by means of the projecting portions 106a and the slot portions 106b, respectively.

An exciting winding and output windings are wound around an outer periphery of each of the projecting portions 106a provided in association with the tooth portions 105a, respectively, and crossover wires (not shown) interconnecting the windings are wound around crossover wire guide members 106c, respectively, which are formed integrally with the insulation cap 106 between the tooth portions 105a, respectively.

Formed integrally with the insulation caps 106 at an outer peripheral portion thereof is a connector 107 which is provided with a plurality of terminals 107a. Lead wires connected to the individual terminals 107a, respectively, are led out from the connector 107 in the form of a cable. Further, end portions of the individual windings wound around the outer peripheries of the individual projecting portions 106a are electrically and mechanically connected to the terminals 107a, respectively.

Disposed rotatably at a center position of the annular stator 101 implemented in the structure described above is a rotor (not shown in FIG. 20) which is constituted solely by an iron core having no winding mounted thereof. In this conjunction, it is to be noted that the rotor is so disposed that the center thereof is deviated from that of the annular stator 101. To say in another way, the rotor is so structured or arranged that gap permeance prevailing between the rotor and the tooth portions 105a of the annular stator 101 changes sinusoidally as a function of a rotation angle of the rotor relative to the stator. Incidentally, in place of disposing eccentrically the circular rotor relative to the annular stator 101 as mentioned above, the rotor may be disposed concentrically with the annular stator 101 by forming the rotor in a non-circular shape, substantially to the same effect.

In operation of the rotation angle detecting apparatus of the structure described above, an electric voltage having a predetermined sinusoidal waveform is applied to the exciting winding mentioned previously. In this state, the rotor mounted on a rotatable shaft of an instrument or a machine is rotated, gap permeance prevailing between the annular stator 101 and the rotor changes, as a result of which the amplitude of the output voltage of the output winding and the phase thereof relative to the exciting signal change correspondingly. Thus, by processing the signal derived from the output winding by means of a proper detecting circuit, it is possible to detect the rotation angle (or angular position) of the rotating shaft mentioned above.

The conventional rotation angle detecting apparatus however suffers a problem that because of the structure of the annular stator 101 descried above, work involved in forming the windings becomes very troublesome when the apparatus is to be implemented in a small or miniature size, making it practically difficult to manufacture the rotation angle detecting apparatus of a small size. Besides, a lot of time is taken for forming the winding, incurring a problem that the manufacturing cost increases.

SUMMARY OF THE INVENTION

In the light of the state of the art described above, it is an object of the present invention to provide a rotation angle detecting apparatus of an improved structure which can facilitate the winding process while ensuring high productivity and which can be manufactured in a small or miniature size at a low cost.

In view of the above and other objects which will become apparent as the description proceeds, there is provided according to an aspect of the present invention a rotation angle detecting apparatus which includes a stator core assembly comprised of a plurality of strip-like core sheets each having a plurality of core members each of which includes a tooth portion and a yoke portion and which are disposed in a strip-like array with adjacent ones of the core members being coupled to one another by coupling means provided at end portions of the yoke portion. The plurality of the strip-like core sheets are superposed or laminated. The stator core assembly formed in this manner can be shaped into an annular form by bending the core members relative to one another through the medium of the coupling means so that the tooth portions extend toward a center of annulus. On the other hand, the stator core assembly can be extended at least approximately linearly when the stator core assembly is expanded. The rotation angle detecting apparatus further includes an exciting winding and output windings of n phases woud on the tooth portions and a rotor core assembly disposed rotatably relative to the stator core assembly such that gap permeance prevailing between the rotor core assembly and the tooth portions of the stator core assembly changes sinusoidally as a function of the rotation angle.

By virtue of the arrangement of the rotation angle detecting apparatus described above, the winding process can be carried out in the state where the stator core assembly is expanded substantially linearly with sufficient space being formed around the individual tooth portions. In other words, work for winding can easily be performed within a relatively short time, whereby the production efficiency can be improved, and thus the rotation angle detecting apparatus can be manufactured inexpensively. Besides, even in the case where the stator core assembly is of a small size, the space required for winding can be assured. Thus, the rotation angle detecting apparatus of a smaller size than the conventional one can be realized.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
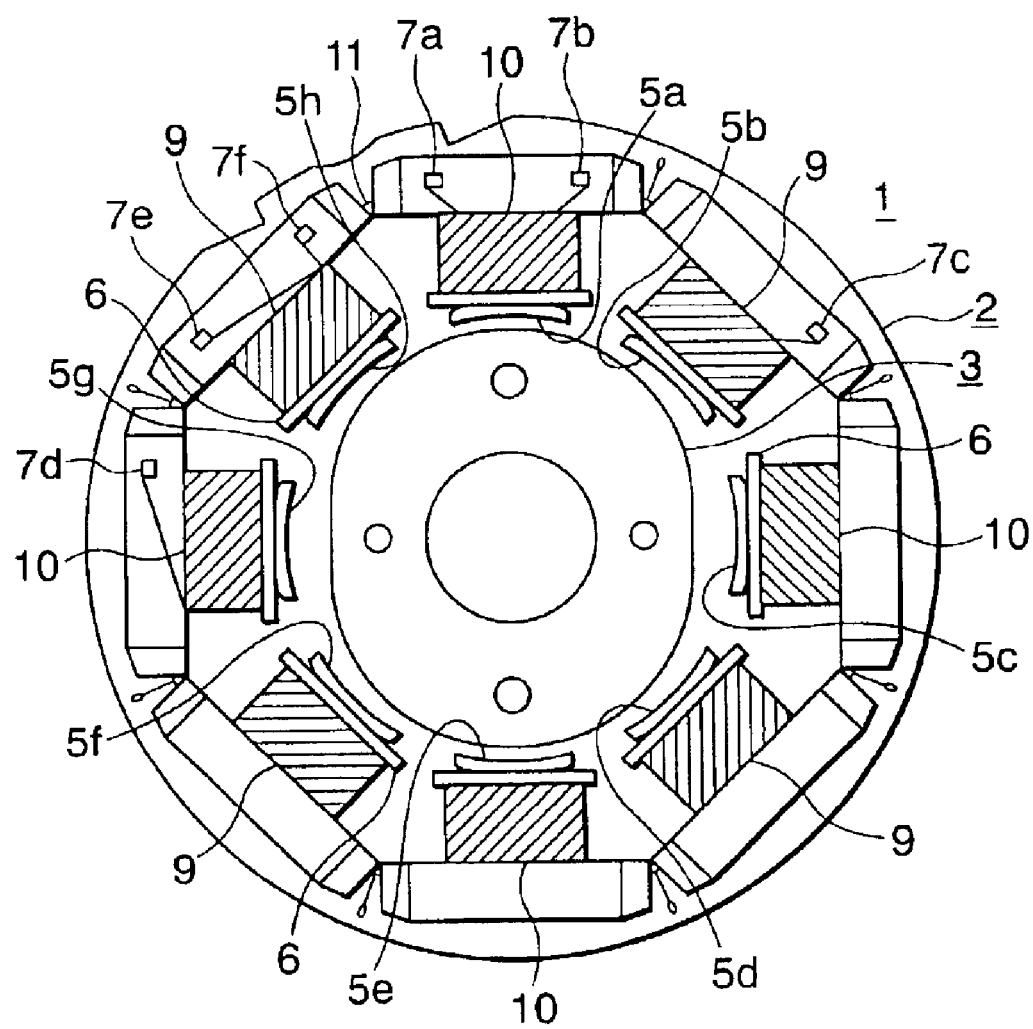
FIG. 1 is a plan view of a rotation angle detecting apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "top", "bottom", "clockwise", "counterclockwise" or the like are words of convenience and are not to be construed as limiting terms.

Embodiment 1

FIG. 1 is a plan view of a rotation angle detecting apparatus according to a first embodiment of the present invention. Referring to FIG. 1, the rotation angle detecting apparatus generally denoted by reference numeral 1 includes an annular stator core assembly 2 manufactured by stacking or laminating silicon steel plates (sheets) or the like. Disposed at the center of the stator core assembly 2 rotatably relative thereto is a non-circular rotor core assembly 3 which is also fabricated by laminating silicon steel plates or the like.

For providing the stator core assembly 2 with windings, eight tooth portions 5a to 5h are so formed as to protrude toward the center of the stator core assembly 2, wherein one set of exciting windings 8 (not shown) and two sets of output windings 9 and 10 (corresponding to two phases) are wound around the tooth portions 5a to 5h with interposition of insulators 6, respectively, each of which is made of an insulation material such as a resin or the like material.

More specifically, the stator core assembly 2 is provided with the eight tooth portions 5a to 5h protruding toward the center of the annular stator core assembly 2, wherein each of the first tooth portion 5a, the third tooth portion 5c, the fifth tooth portion 5e and the seventh tooth portion 5g is wound with the exciting winding 8 (not shown) and a second output winding 10, while each of the second tooth portion 5b, the fourth tooth portion 5d, the sixth tooth portion 5f and the eighth tooth portion 5h is wound with the exciting winding 8 (not shown) and the first output winding 9.

The rotor core assembly 3 presents a specific outer appearance. More specifically, the rotor core assembly 3 is imparted with such a unique shape that gap permeance prevailing between the rotor core assembly 3 and the stator core assembly 2 undergoes change of a predetermined pattern upon rotation of the rotor core assembly 3. At this juncture, it should be added that the insulator 6 of resin is formed integrally with the stator core assembly 2 by resorting to an insert molding process.

Leading end portions and trailing end portions of the windings are bound fixedly to six upstanding terminals 7a, . . . , 7f which are formed in the insulator 6 for the purpose of electrically connecting the windings to external circuits such as an external circuit, a detecting circuit and the like. The terminals 7a, . . . , 7f are each formed in a predetermined shape with a predetermined length by pressing a wire raw material of a copper alloy and embedded in the insulator 6 concurrently upon molding thereof.

In the following, description will be directed to the structures of the individual constituents and manufacturing processes thereof.

Figure 2:
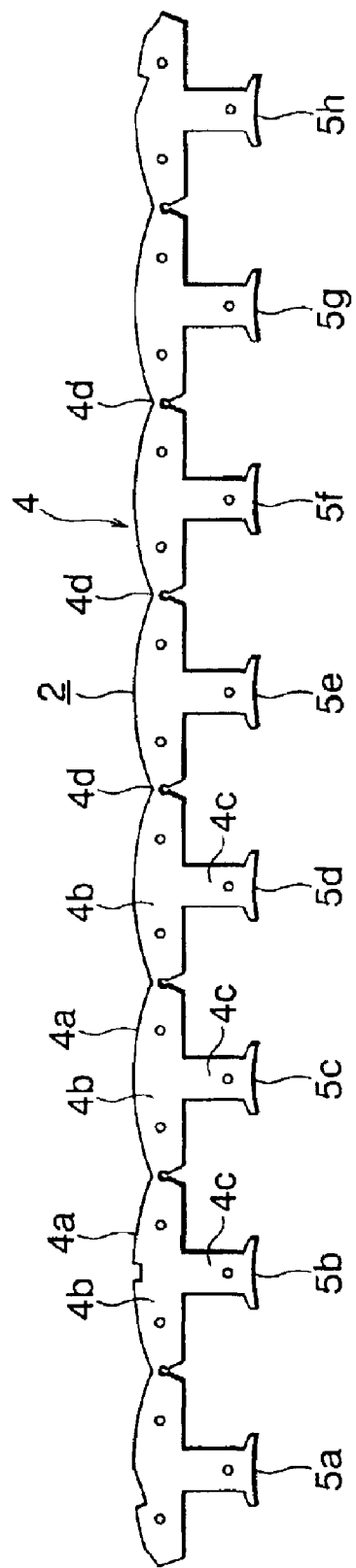
FIG. 2 is a top plan view showing a stator core assembly in a linear expanded state before being bent circularly or annularly.
Figure 3:
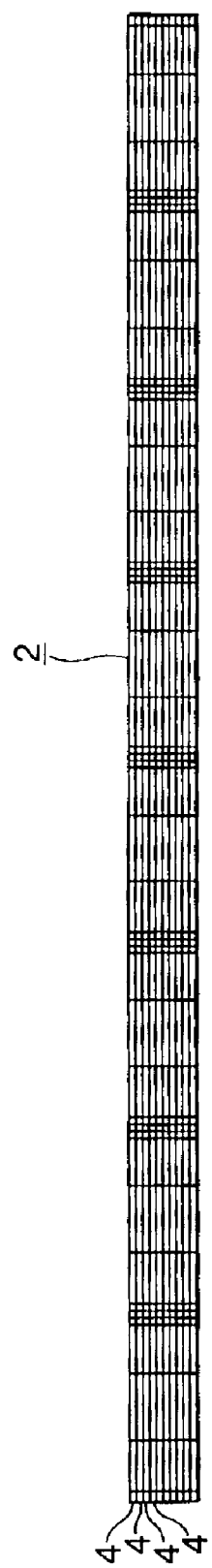
FIG. 3 is a front view of the same.

FIG. 2 is a plan view showing the stator core assembly in the state before being bent circularly or annularly, i.e., in the state expanded substantially linearly. FIG. 3 is a front view of the same. Referring to the figures, reference numeral 4 generally denotes a strip-like core sheet which is formed of silicon steel plate or the like in such a pattern in which eight T-like core members 4a are disposed substantially in a linear strip-like array, being physically connected to one another. The stator core assembly 2 is made up by stacking or laminating ten strip-like core sheets 4. The strip-like core sheet 4 may be formed through a blanking/staking process by using a sheet metal press.

The T-like core member 4a is composed of a yoke portion 4b which has an outer side edge substantially of an arcuate shape and an opposite side edge extending substantially linearly and a tooth portion 4c which extends orthogonally from a center portion of the yoke portion 4b. Adjacent ones of the T-like core members 4a are interconnected to each other via a notched portion 4d formed at one end of the yoke portion 4b and serving as an interconnecting means. The stator core assembly 2 formed in this way is provided with the first to eighth tooth portions 5a, . . . , 5h.

Figure 4:
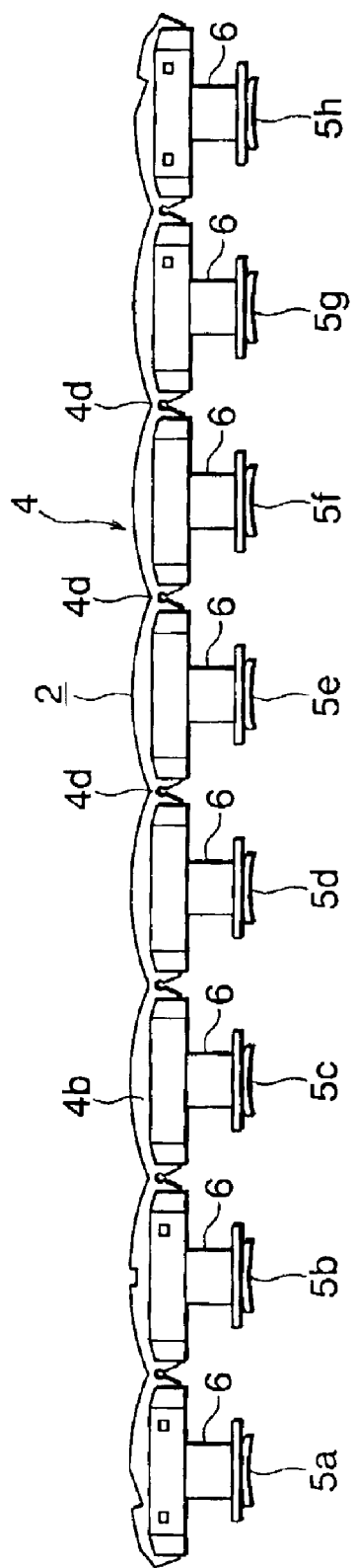
FIG. 4 is a top plan view showing the stator core assembly in the state in which insulators are provided.
Figure 5:
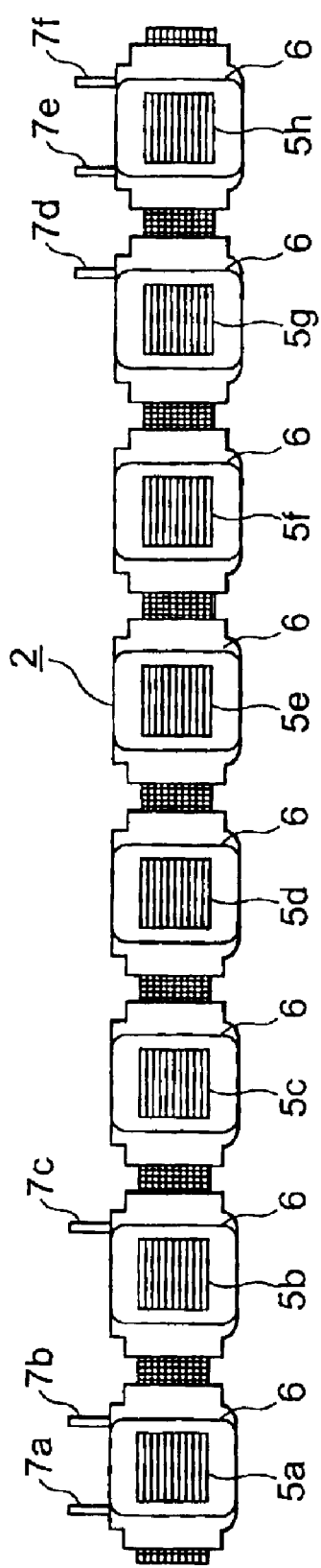
FIG. 5 is a front view of the same.
Figure 6:
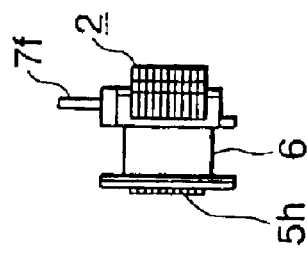
FIG. 6 is an end view of the same.

FIG. 4 is a top plan view showing the stator core assembly in the state in which the insulators are provided. FIG. 5 is a front view of the same. Further, FIG. 6 is an end view of the same. As can be seen in FIGS. 4 to 6, the insulator 6 is formed of a resin through an insert molding process on the surface of each of the yoke portions 4b on the side where the tooth portion is formed and around each of the tooth portions 5a to 5h. Simultaneously with the insert molding of the insulator 6, the six terminals 7a to 7f for securing fixedly the leading and trailing end portions of the winding wires or conductors are embedded within the resin insulators 6.

Figure 7:
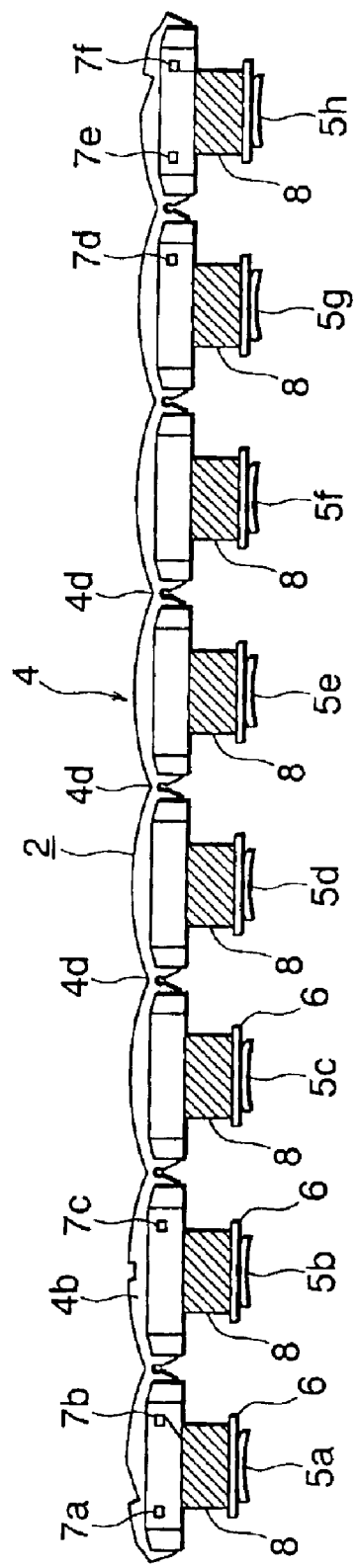
FIG. 7 is a plan view for illustrating a manner in which an exciting winding is wound on a core lamination with an insulator being interposed.

FIG. 7 is a plan view for illustrating a manner in which the exciting winding is wound on the lamination assembly with the insulator being interposed. The leading end portion of the wire or conductor forming the exciting winding 8 is firstly secured to the second terminal 7b by binding, whereon the conductor of the exciting winding 8 is wound clockwise around the first tooth portion 5a by a predetermined number of turns. Subsequently, the conductor of the exciting winding is wound counterclockwise around the second tooth portion 5b by a same number of turns as the first tooth portion 5a. In succession, the tooth portions 5c to 5h are sequentially wound with the conductor with the winding direction being alternately changed from clockwise to counterclockwise direction on a per tooth portion basis. After the exciting winding 8 having been formed by winding the conductor counterclockwise around the eighth tooth portion 5h, the trailing end portion of the conductor is fixedly bound to the seventh terminal 7f. In this manner, the exciting winding 8 is formed. At this juncture, it is to be noted that in the winding process mentioned above, the conductor can easily and speedily wound within a relatively short time because the stator core assembly 2 is substantially of a linearly expanded or elongated shape and thus a sufficient space is available between the adjacent ones of the individual tooth portions 5a, . . . , 5h. Needless to say, the winding operation can easily be carried out even in the case where the rotation angle detecting apparatus 1 is implemented in a small or miniature size.

Figure 8:
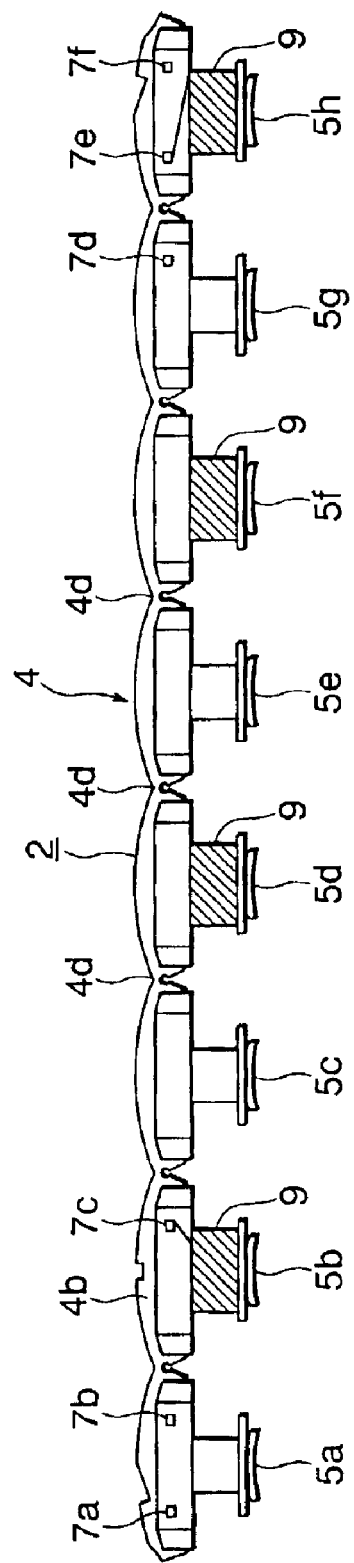
FIG. 8 is a plan view for illustrating a manner in which a first output winding is further wound on and around the exciting winding which has already been wound on each of individual tooth portions.

FIG. 8 is a plan view for illustrating a manner in which the first output winding is additionally wound on and around the exciting winding which has already been wound on each of the individual tooth portions. More specifically, the leading end portion of the wire or conductor which is to constitute the first output winding 9 is firstly secured to the third terminal 7c by binding, whereon the conductor of the first output winding 9 is wound clockwise by a predetermined number of turns around the exciting winding which has already been wound on and around the second tooth portion 5b. Subsequently, skipping the third tooth portion 5c, the conductor of the first output winding is wound counterclockwise around the fourth tooth portion 5d by a same number of turns as the second tooth portion 5b. In succession, the sixth tooth portion 5f is wound clockwise with the first output winding conductor, which is then followed by counterclockwise winding of the first output winding conductor around the eight tooth portion 5h. After the first output winding 9 have been formed by winding the conductor counterclockwise around the eighth tooth portion 5h, the trailing end portion of this conductor is fixedly bound to the fifth terminal 7e. The winding conductor portions tied up around the terminals are electrically and mechanically secured to the terminals by dip soldering. Incidentally, in FIG. 8, the exciting winding 8 which has already been wound is omitted from illustration with a view to making clear the positions at which the first output winding 9 is to be wound.

Figure 9:
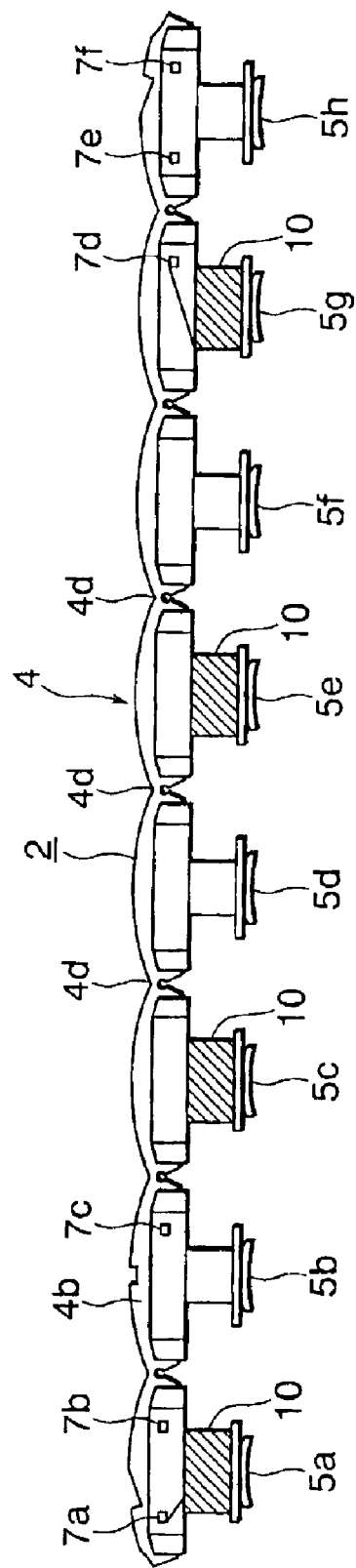
FIG. 9 is a plan view for illustrating a manner in which a second output winding is further wound on and around the exciting winding which has already been wound on each of the individual tooth portions.

FIG. 9 is a plan view for illustrating a manner in which the second output winding is further wound on and around the exciting winding which has already been wound on each of the individual tooth portions. The leading end portion of the wire or conductor which is to constitute the second output winding 10 is firstly secured to the first terminal 7a by binding, whereon the conductor of the second output winding 10 is wound counterclockwise by a predetermined number of turns on and around the exciting winding 8 which has already been wound around the first tooth portion 5a. Subsequently, skipping the second tooth portion 5b, the second output winding conductor is wound clockwise around the third tooth portion 5c by a same number of turns as the first tooth portion. In succession, the fifth tooth portion 5e is wound counterclockwise with the second output winding conductor, which is then followed by clockwise winding of the conductor around the seventh tooth portion 5g. After the second output winding 10 has been formed by winding the conductor clockwise around the seventh tooth portion 5g, the trailing end portion of the second output winding conductor is fixedly bound to the fourth terminal 7d. The winding conductor portions tied up around the terminals are electrically and mechanically secured to the terminals by dip soldering. Incidentally, in FIG. 9, the exciting winding 8 which has already been wound is omitted from illustration with a view to making clear the positions at which the second output winding 10 is to be wound.

The windings provided around the tooth portions as described above may be fixed by employing a so-called self-bonding conductor or by using varnish.

Figure 10:
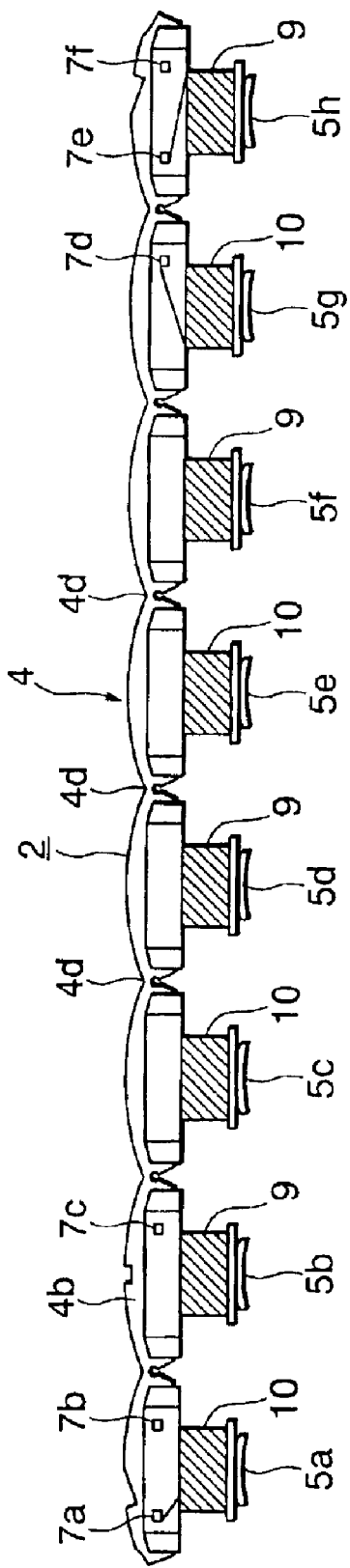
FIG. 10 is a plan view showing the stator core assembly in the state in which the winding process has been completed.

FIG. 10 shows the stator core assembly 2 in the state in which the winding therefor has been completed through the process described above.

Turning back to FIG. 1, the stator core assembly 2 for which the winding process has been completed is then shaped into an annular form by crooking or bending appropriately the stator core assembly 2 at the notched portions 4d, respectively, whereon the abutting end portion 11 at which both end of the stator core assembly 2 are abutted each other can be secured together, for example, by a laser welding. Thus, the annular stator core assembly 2 is finished.

In the rotation angle detecting apparatus according to the instant embodiment of the invention, the insulator 6 is formed through the insert molding process. It should however be appreciated that the insulator 6 may be formed as discrete parts and mounted individually on the stator core assembly 2.

Further, it has been described that the terminals 7a, . . . , 7f are inserted or embedded concurrently with formation of the insulator 6. However, it is equally possible to form only insertion holes upon molding of the insulator 6 and insert snugly under pressure the terminals into the insertion holes, respectively, in another step.

Next, description will turn to operation of the rotation angle detecting apparatus 1. In the state where the stator core assembly 2 and the rotor core assembly 3 have been assembled or built in a machine of concern, a sinusoidal voltage of e.g. 5 Vpp (peak-to-peak voltage) and 10 kHz is applied across the terminals of the exciting winding 8 from an external exciting circuit. As the rotor core assembly 3 mounted on a rotatable shaft of the machine rotates in accompanying rotation thereof, gap permeance prevailing between the stator core assembly 2 and the rotor core assembly 3 changes, as a result of which the amplitudes of the output voltages of the first output winding 9 and the second output winding 10 and the phases thereof relative to the exciting signal are caused to change correspondingly. In the case of the rotation angle detecting apparatus according to the instant embodiment of the invention, the rotor core assembly 3 is formed with two convex portions or protrusions so that two cycles of the sine wave can be generated per revolution of the rotor core assembly 3.

The phase of the output voltage of the first output winding 9 is deviated by 90 degrees from the phase of the output voltage of the second output winding 10. Thus, by processing these voltage signals by means of an appropriate detecting circuit, the rotation angle can be detected.

As can be understood from the foregoing, since the rotation angle detecting apparatus is so arranged as to detect the change of gap permeance between the stator core assembly 2 and the rotor core assembly 3 to thereby determine the rotation angle, high dimensional precision is required as to the bore circularity of the stator core assembly 2 and the external diameter of the rotor core assembly 3.

In the foregoing, it has been presumed that the rotation angle detecting apparatus according to the instant embodiment of the invention is equipped with two sets of output windings 9 and 10, i.e., output windings of two phases. It should however be appreciated that the teachings of the present invention can be applied to the rotation angle detecting apparatus of three or more phases as well.

Furthermore, in the rotation angle detecting apparatus according to the instant embodiment of the invention, eight tooth portions 5a to 5h are provided while the rotor core assembly 3 is provided with two discrete convex portions (protrusions). However, the present invention is never restricted thereto. The invention can equally find application to the rotation angle detecting apparatus which includes a sixteen-slot stator provided with sixteen tooth portions and a rotor core assembly which is formed with four convex portions.

Embodiment 2

Figure 11:
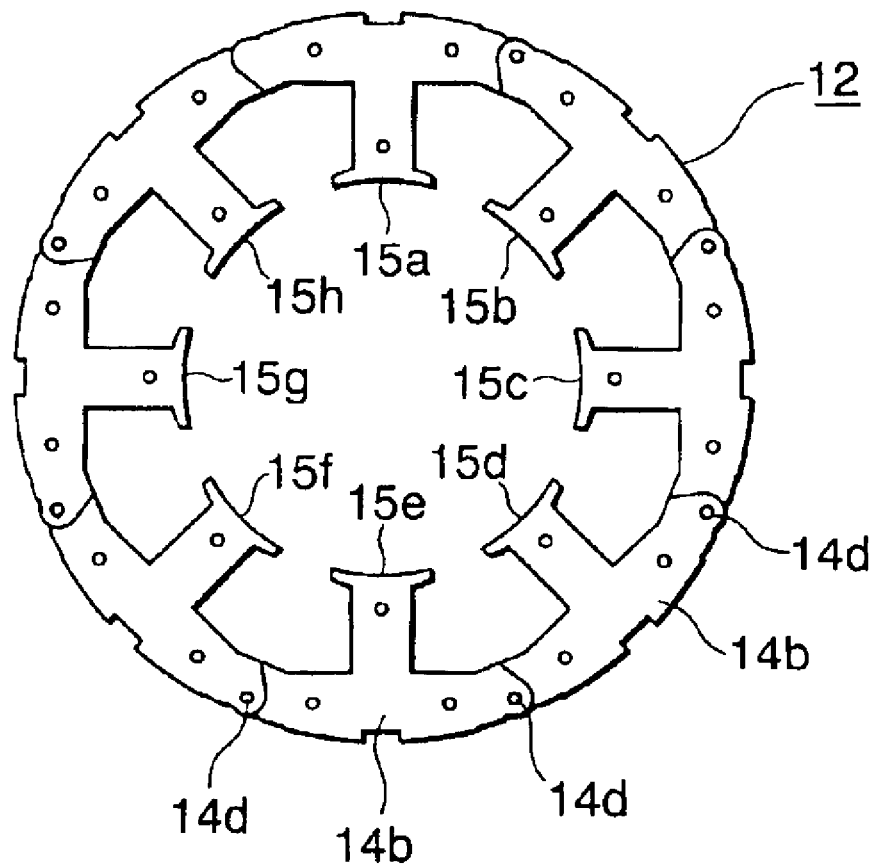
FIG. 11 is a plan view showing a stator core assembly of the rotation angle detecting apparatus according to a second embodiment of the present invention.

FIG. 11 is a plan view showing a stator core assembly of the rotation angle detecting apparatus according to a second embodiment of the present invention. In the rotation angle detecting apparatus according to the instant embodiment of the invention, yoke portions 14b of the individual T-like core members are interconnected through the medium of joint portions 14d each serving as a coupler. More specifically, at the joint portion 14d, adjacent yoke portions 14b are pivotally coupled to each other. Incidentally, at the joint portion 14d, the adjacent yoke portions 14b each having a convex portion and a concave portion formed in the respective opposite surfaces are stacked or laminated and pivotally or swingably coupled together through a punching/caulking process by using a sheet metal press.

In the following, description will be made of the structures of the constituents and the manufacturing process.

Figure 12:
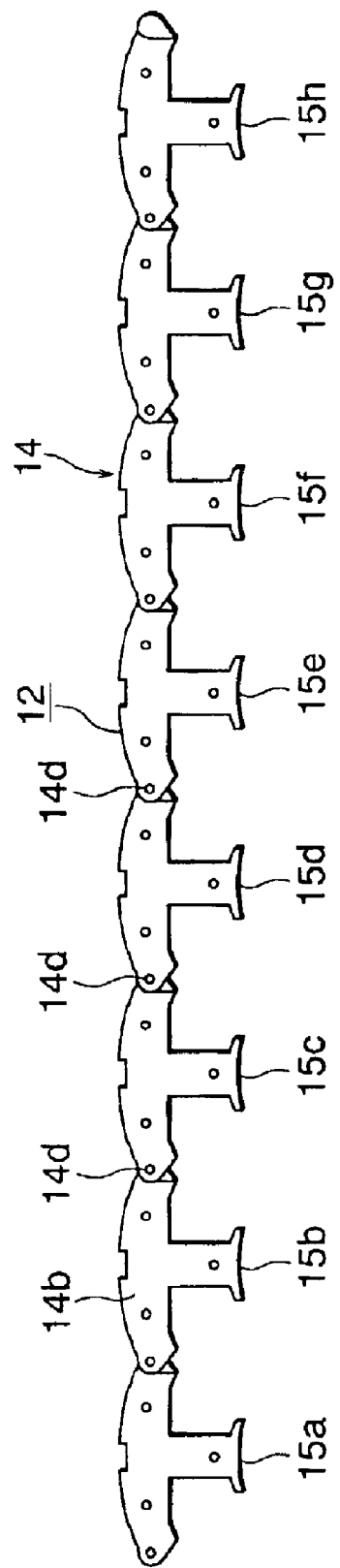
FIG. 12 is a top plan view showing the same in the state expanded linearly.
Figure 13:
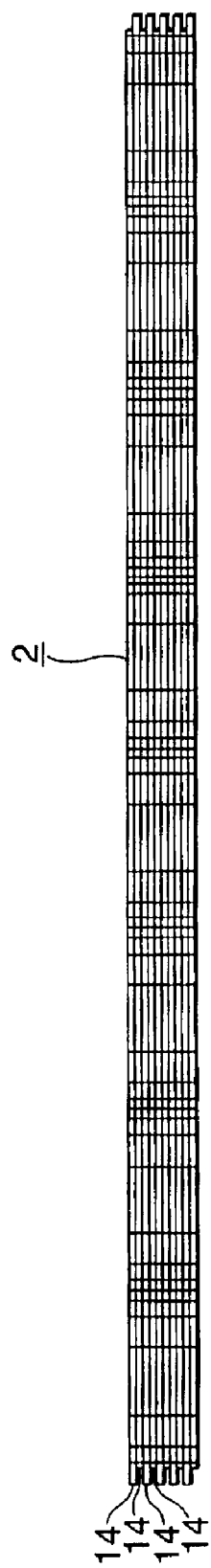
FIG. 13 is a front view of the same.
Figure 14:
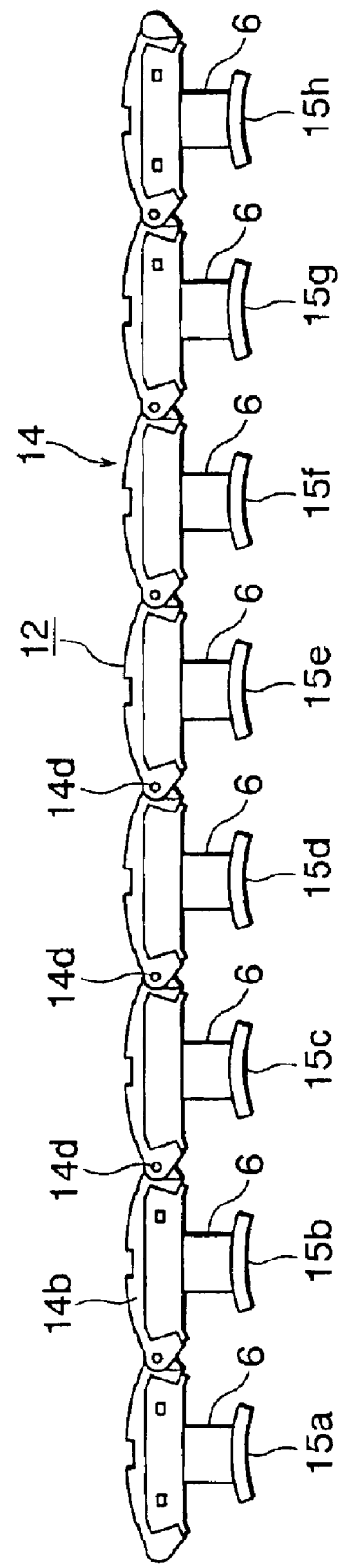
FIG. 14 is a top plan view showing the stator core assembly in the expanded state in which the insulators are provided.
Figure 15:
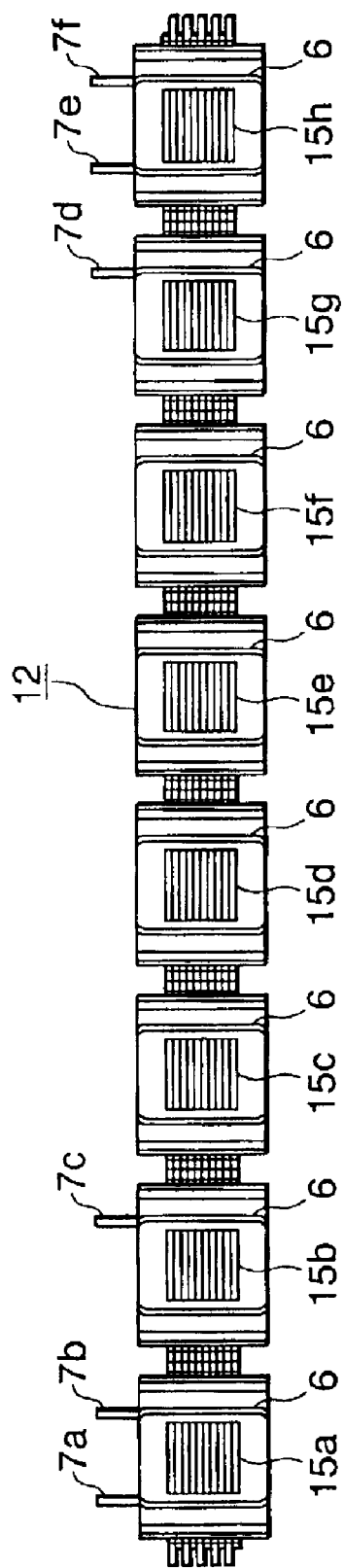
FIG. 15 is a front view of the same.
Figure 16:
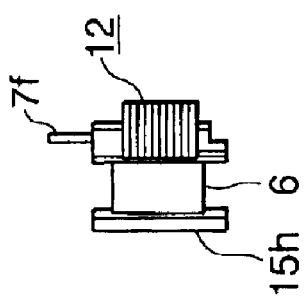
FIG. 16 is an end view of the same.

FIG. 12 is a plan view showing the stator core assembly in the state expanded substantially linearly. FIG. 13 is a front view of the same. At first, the stator core assembly 12 is expanded or stretched out linearly as shown in FIGS. 12 and 13. FIG. 14 is a plan view showing the stator core assembly expanded in the state in which the insulators are provided. FIG. 15 is a front view of the same. Further, FIG. 16 is an end view of the same. Similarly to the first embodiment of the invention, the insulator 6 is formed of a resin through an insert molding process on the surface of each of the yoke portions 14b on the side where the tooth portion is formed and around each of the tooth portions 15a to 15h. Simultaneously with the insert molding of the insulator 6, the six terminals 7a to 7f for securing fixedly the leading and trailing end portions of the winding wire are embedded within the resin insulators 6.

Figure 17:
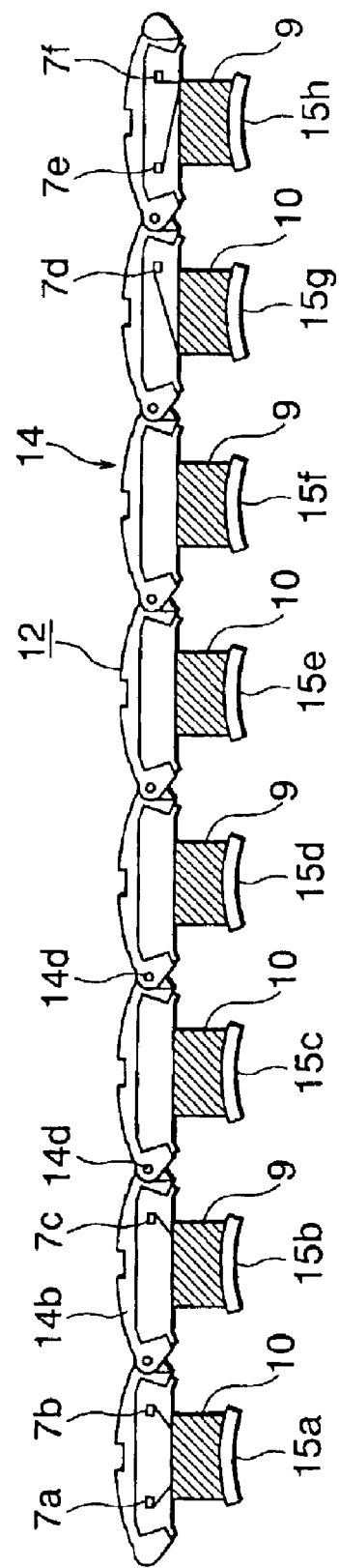
FIG. 17 is a plan view showing a stator core assembly in the state in which the winding process has been completed.

Subsequently, the windings are provided in a substantially same manner as described hereinbefore in conjunction with the first embodiment. Thus, there can be obtained the stator core assembly 12 of the state in which winding has been completed, as shown in FIG. 17. At this juncture, it should be noted that the winding process can easily be carried out within a relatively short time because sufficiently large spaces are formed between the adjacent ones of the tooth portions 15a, . . . , 15h. Further, it should also be added that the winding process can be realized without any appreciable difficulty even in the case where the rotation angle detecting apparatus to be manufactured is of a small or miniature size.

Incidentally, it is preferred that the stator core assembly 12 can be expanded or stretched out at least approximately linearly. Furthermore, the space between the individual tooth portions 15a, . . . , 15h can be increased by crooking or bending the stator core assembly 12 in the direction opposite to the direction n which the tooth portions 15a to 15h extend projectingly.

Figure 18:
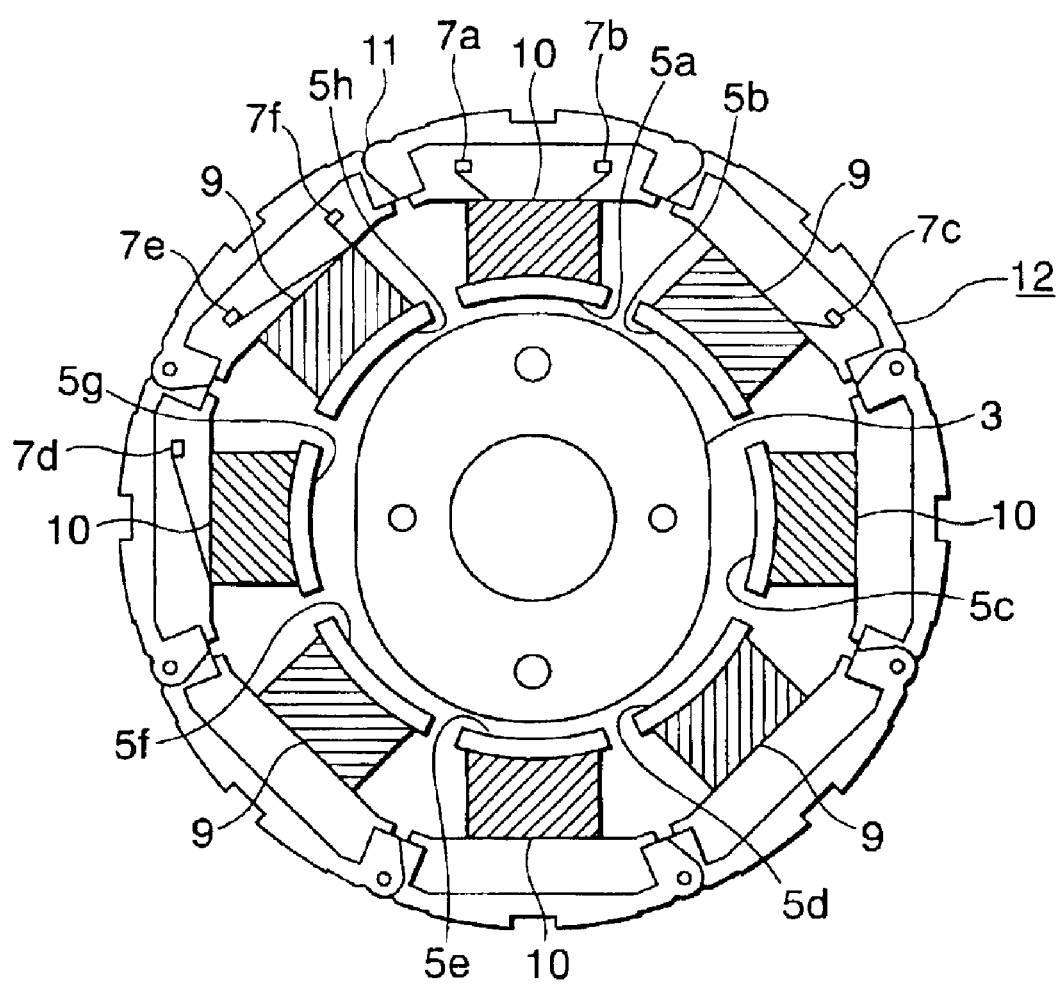
FIG. 18 is a plan view of the rotation angle detecting apparatus according to the second embodiment of the invention.

FIG. 18 is a plan view of the rotation angle detecting apparatus according to the instant embodiment of the invention. In the stator core assembly 12 for which the winding process has been completed, the individual T-like core members are rotated for a predetermined angle around the joint portion 14d, respectively, to be thereby shaped into an annular structure, whereon the abutting end portions 11 at which both ends of the stator core assembly 12 are abutted each other are bonded together by welding. Thus, the annular stator core assembly 12 is finished.

Embodiment 3

Figure 19:
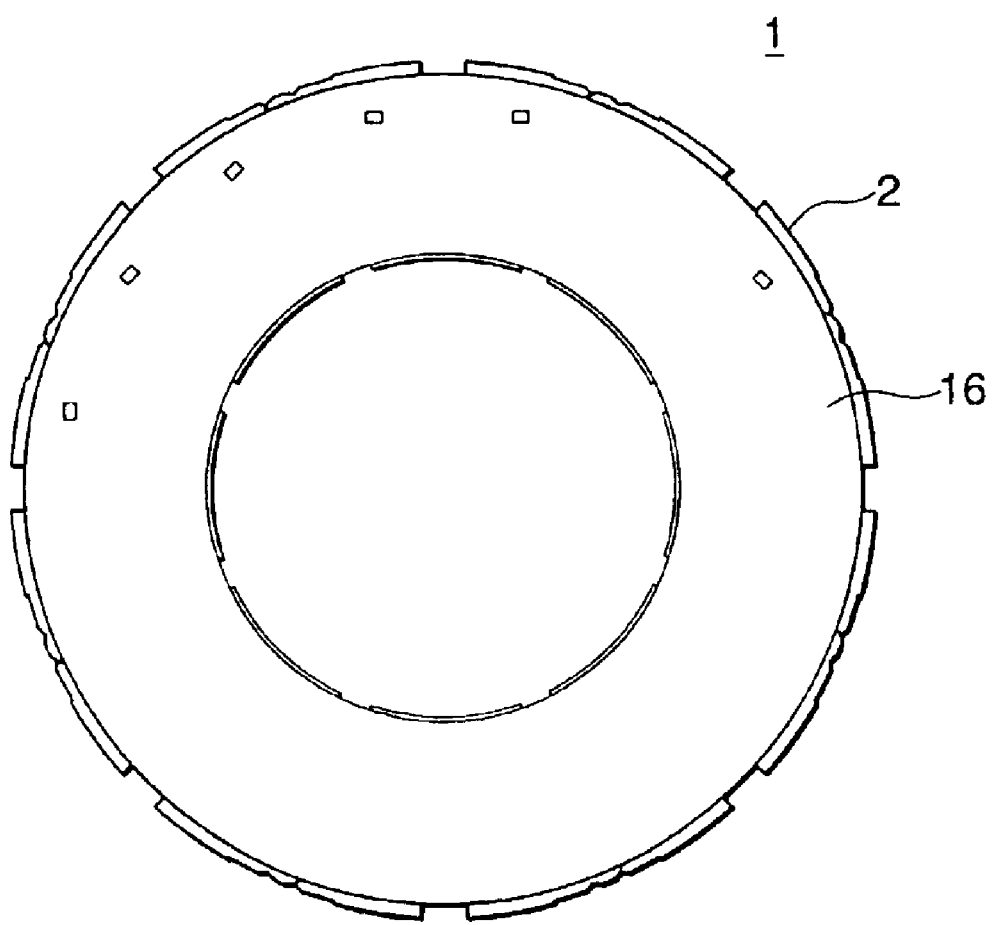
FIG. 19 is a plan view showing a rotation angle detecting apparatus according to a third embodiment of the present invention.
Figure 20:
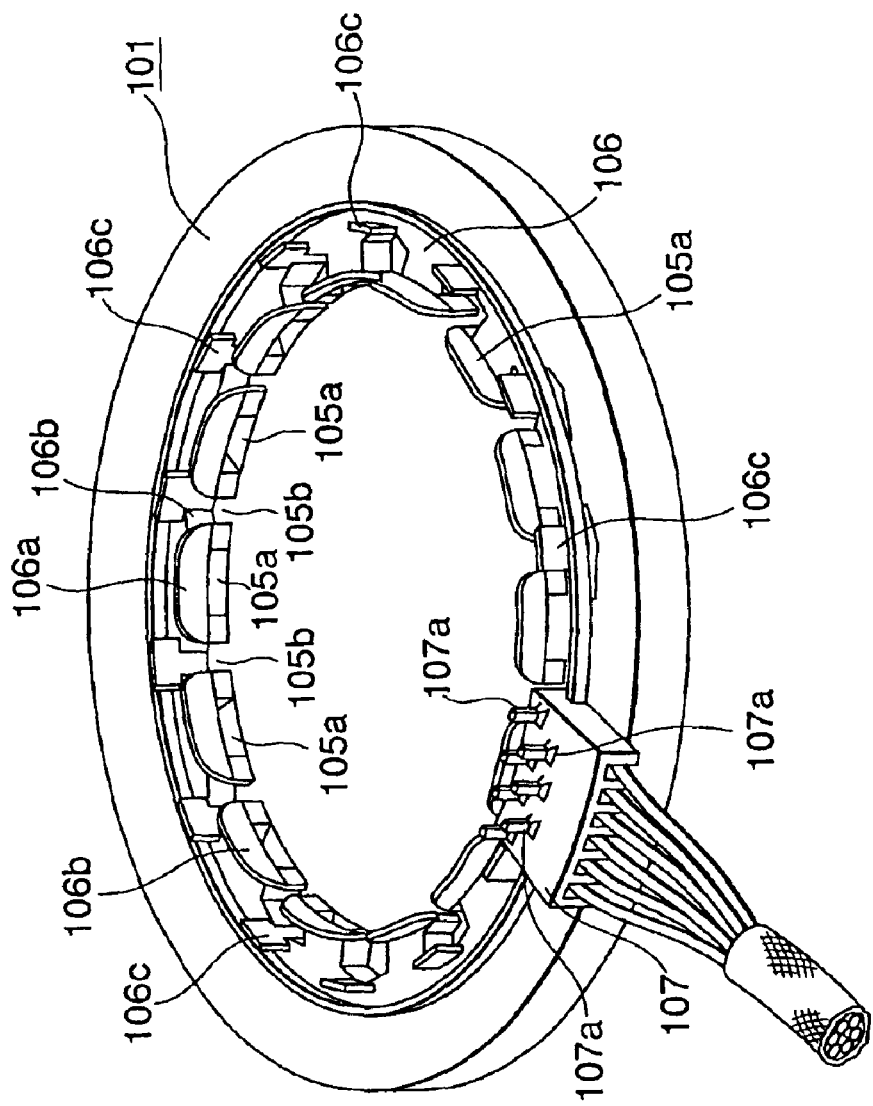
FIG. 20 is a perspective view showing an annular stator of a conventional rotation angle detecting apparatus.

FIG. 19 is a plan view showing a rotation angle detecting apparatus according to a third embodiment of the present invention. According to the teaching of the invention incarnated in the instant embodiment, the stator core assembly 2 is shaped into an annular form through the procedure described hereinbefore in conjunction with the first and second embodiments, and then a mandrel (not shown) is inserted into an inner circular space of the stator core assembly 2. In this state, all of the stator core assembly 2, the exciting winding 8 and the first and second output windings 9 and 10 are secured in an integral structure secured together by filling a moldable resin 16.

The rotation angle detecting apparatus according to the instant embodiment of the invention can enjoy an advantage that not only the weathering resistance and the anti-vibration property can be improved but also the bore circularity of the stator core can be enhanced because the inner circular surface of the stator core assembly 2 is forcibly pressed against the outer peripheral surface of the mandrel under resin molding pressure.

As is apparent from the foregoing, the present invention has provided the rotation angle detecting apparatus which includes the stator core assembly comprised of a plurality of strip-like core sheets each having a plurality of core members each of which includes the tooth portion and the yoke portion and which are disposed in the strip-like array with adjacent ones of the core members being coupled to one another by the coupling means provided at end portions of the yoke portion. The plurality of the strip-like core sheets are superposed or laminated. The stator core assembly formed in this manner can be shaped into an annular form by bending the core members relative to one another through the medium of the coupling means so that the tooth portions extend toward the center of annulus. On the other hand, the stator core assembly can be extended or stretched at least approximately linearly when the stator core assembly is expanded. The rotation angle detecting apparatus further includes the exciting winding and the output windings of n phases wound on the tooth portions and the rotor core assembly disposed rotatably relative to the stator core assembly such that gap permeance prevailing between the rotor core assembly and the tooth portions of the stator core assembly changes substantially sinusoidally as a function of the rotation angle.

With the arrangement of the rotation angle detecting apparatus described above, the winding process can be carried out in the state where the stator core assembly is expanded or stretched out substantially linearly with sufficient space being formed between and around the individual tooth portions. Thus, work for winding can easily be performed within a relatively short time, whereby the production efficiency can be enhanced, and thus the rotation angle detecting apparatus can be manufactured inexpensively. Besides, even in the case where the stator core assembly is of a small size, the space required for the winding can be assured sufficiently. Thus, the rotation angle detecting apparatus of a smaller size than the conventional one can be realized.

In the rotation angle detecting apparatus mentioned above, the coupling means can be realized in the form of the notched portion provided bendably between adjacent end portions of the yoke portions of the core members.

With the arrangement of the rotation angle detecting apparatus described above, the structure can be simplified, and thus the rotation angle detecting apparatus can be realized inexpensively.

Further, in the rotation angle detecting apparatus mentioned above, the coupling means can be so arranged that adjacent ones of the yoke portions of the core members are rotatable relative to each other at adjacent end portions thereof.

With the arrangement of the rotation angle detecting apparatus described above, the yoke portions can easily be bent relative to one another, whereby the stator core assembly can easily be shaped into an annular form with high precision.

Moreover, in the rotation angle detecting apparatus mentioned above, the coupling means can be realized by the concave portion and the convex portion formed at end portions of the yoke portions, respectively, through punching/caulking with the sheet metal press, and the concave portion and the convex portion are mutually superposed so that the adjacent yoke portions can be rotated around the superposed portion.

With the arrangement of the rotation angle detecting apparatus described above, the coupling means allows the adjacent core members to rotate easily relative to each other, whereby the rotation angle detecting apparatus of high performance can be realized inexpensively.

Besides, in the rotation angle detecting apparatus mentioned above, all of the stator core assembly, the exciting winding and the output windings can be embedded sealingly in the molded resin body.

With the arrangement of the rotation angle detecting apparatus described above, durability and anti-vibration property of the apparatus can be improved. Furthermore, bore surface of the stator core assembly is pressed against the outer peripheral surface of the mandrel, whereby the bore circularity of the stator core assembly can be improved, which in turn contributes to enhancement of the detection accuracy.

Many modifications and variations of the present invention are possible in the light of the above techniques. It is therefore to be understood that within the scope of the appended claims, the invention may be practiced otherwise than as specifically described.

What is claimed is:

1. An apparatus for detecting an angle of rotation, comprising:

a stator core assembly comprised of a plurality of strip-like core sheets each having a plurality of core members each of which includes a tooth portion and a yoke portion and which are disposed in a strip-like array with adjacent ones of said core members being coupled to one another by coupling means provided at end portions of said yoke portion, said plurality of core members being laminated, said stator core assembly being be shaped into an annular form by bending said core members relative to one another through the medium of said coupling means so that said tooth portions extend toward a center of said annular form while said stator core assembly extends at least approximately linearly when said stator core assembly is expanded;

an exciting winding and output windings of n phases wound on said tooth portions, and a rotor core assembly disposed rotatably relative to said stator core assembly such that gap permeance prevailing between said rotor core assembly and said tooth portions of said stator core assembly changes sinusoidally as a function of the rotation angle, wherein said coupling means is so arranged that adjacent ones of said yoke portions of said core members are rotatable relative to each other at adjacent end portions thereof, said coupling means is realized by a concave portion and a convex portion formed at end portions of the yoke portions, respectively, through a punching and caulking process by a sheet metal press, and said concave portion and said convex portion are superposed so that said adjacent yoke portions can be rotated around said superposed portion.

2. The rotation angle detecting apparatus according to claim 1, wherein all of said stator core assembly, said exciting winding and said output windings are embedded sealingly in a molded resin body.

* * * * *